United States Patent [19]

Brittingham, Jr.

[11] Patent Number: 4,635,829
[45] Date of Patent: Jan. 13, 1987

[54] MEASURED VOLUME DISPENSER

[76] Inventor: Louis W. Brittingham, Jr., 121 Hemlock, Sunnyside, Wash. 98944

[21] Appl. No.: 739,432

[22] Filed: May 30, 1985

[51] Int. Cl.⁴ .............. G01F 11/00; G01F 11/10; G01F 11/28
[52] U.S. Cl. .................... 222/278; 222/305; 222/361; 222/404; 222/367; 222/434
[58] Field of Search ............ 222/436, 438, 440, 426, 222/266, 278, 305, 307, 308, 361, 362, 363, 365, 366, 275, 368, 370, 367, 42, 47, 49, 50, 434, 282, 404; 221/263, 264

[56] References Cited

U.S. PATENT DOCUMENTS

| 502,596 | 8/1893 | Suddoth | 222/305 X |
| 743,686 | 11/1903 | Buehne | 222/263 X |
| 2,761,588 | 9/1956 | Shields | 222/361 X |
| 2,765,957 | 10/1956 | Andres | 222/368 X |
| 3,669,358 | 6/1972 | Waldman | 222/361 X |
| 4,084,729 | 4/1978 | Epple | 222/368 X |
| 4,531,658 | 7/1985 | Galopin | 222/361 X |

Primary Examiner—Joseph J. Rolla
Assistant Examiner—Gregory L. Huson
Attorney, Agent, or Firm—Woodard, Weikart, Emhardt & Naughton

[57] ABSTRACT

A dispensing apparatus for dispensing discrete measured amounts of fluent material. A dispenser body includes a horizontal tubular chamber having an upper inlet port and a lower outlet port in communication with the tubular chamber. A reservoir communicates with the inlet port. A piston having a plurality of vertical and horizontal measuring holes is disposed within the horizontal tubular chamber and configured for rotational and reciprocal linear sliding engagement with the tubular chamber and each of the measuring holes can alternatively communicate with the inlet port and the outlet port when so aligned. The amount of fluent material dispensed is determined by the volume of the measuring hole. Another embodiment involves measuring holes open at one end only, with the piston rotatable to alternatively communicate the measuring hole with the inlet port and the outlet port.

5 Claims, 3 Drawing Figures

MEASURED VOLUME DISPENSER

BACKGROUND OF THE INVENTION

1. Field of the Invention

The present invention relates generally to dispensers for dispensing fluent materials, and more particularly to a dispenser which dispenses discrete measured portions of such materials and which is particularly adaptable for dispensing measured portions of selectable volume.

2. Description of the Related Art

A variety of proposals for dispensing discrete measured amounts of a fluent material are shown by the related art, including specific devices as shown in U.S. Pat. Nos. 2,569,257, issued to parker on Sept. 25, 1951; 2,691,467 issued to Holbrook on Oct. 12, 1954; 2,779,512 issued to Steele et al. on Jan. 29, 1957; 2,920,796 issued to Field on Jan. 12, 1960; 3,169,668 issued to Ziegler on Feb. 16, 1965; and 3,332,584 issued to Pennington on July 25, 1967. Of the above references. Parker, Steele and Ziegler are perhaps the most relevant to my invention which is described and claimed below.

Parker shows a hot coffee dispenser having three separate dispensing mechanisms, one each for coffee, cream and sugar. The coffee dispensing mechanism includes a hollow horizontally oriented cylindrical body of circular cross section and having closed ends. The hollow cylindrical body is rotatably mounted within a solid block. A port in the side wall of the hollow cylindrical body is normally in register with a fill spout thereabove which communicates with a reservoir of hot coffee. The hollow cylindrical body is rotatable such that the port is in register with a lower drain spout, thereby dispensing a measured amount of coffee determined by the volume of the hollow cylindrical body.

The cream dispensing mechanism includes a hollow container reciprocally mounted within a longitudinal bore. The container has an inlet opening in the top thereof and an offset outlet opening in its bottom wall. At one end of its path of travel, the inlet opening is in register with an inlet spout communicating with a cream reservoir. At the other end of its path of travel, the outlet opening is in register with a lower drain spout.

The sugar dispensing mechanism includes a block having a longitudinal bore with an upper inlet port and an offset lower outlet port. Reciprocally mounted therein is a block having a plate secured thereto in spaced relationship to one end thereof. The reciprocating block is movable from a first position wherein the space between the block and plate is in register with the inlet port, and a second position wherein the space between the block and plate is in register with the outlet port.

Steele shows a rotatable valve member having two radially opposite measuring pockets which alternately receive powder from above and discharge it below as the valve member is rotated. The volume of the measuring pockets is adjustable by means of a longitudinally moveable end wall.

Ziegler shows a device mountable to a container of instant coffee for dispensing a measured amount thereof. It includes a cylinder mounted to the top of the container and having a longitudinal inlet slot and a radially opposite longitudinal outlet slot. Rotatably mounted within the cylinder is a closed-end measuring sleeve having a longitudinal opening in the side wall thereof, which opening is alternately registrable with the inlet slot and the outlet slot of the cylinder as the sleeve is rotated.

SUMMARY OF THE INVENTION

One embodiment of the present invention involves a dispensing apparatus for dispensing discrete measured amounts of fluent material. Included is a dispenser body defining a horizontal tubular chamber therein. Further defined therein is an inlet port communicating with the top of the tubular chamber and an outlet port communicating with the bottom of the tubular chamber. The inlet port and the outlet port are offset with respect to each other along the length of the tubular chamber. A piston is disposed within the tubular chamber and configured for reciprocal linear displacement therein and for rotation thereis, the piston defining therethrough a vertical measuring hole and a horizontal measuring hole oriented at right angles to the vertical measuring hole. Each measuring hole has open ends configured in tight-fitting sliding engagement with the tubular chamber, wherein there is defined a measuring space of a desired volume bounded by the tubular chamber and the measuring hole. Each measuring hole alternately communicates with the inlet port and the outlet port when aligned therewith as the piston is displaced linearly. A reservoir communicates with the inlet port. The volume of fluent material dispensed from the reservoir per reciprocation of the piston is determined by the volume of the selected measuring space aligned with the inlet and outlet ports- .

It is an object of the present invention to provide an improved measured volume dispenser for dispensing discrete measured volumes of fluent materials.

Further objects and advantages of the present invention will be apparent from the following description of particular embodiments.

DESCRIPTION OF THE PREFERRED EMBODIMENT

Figure 1:
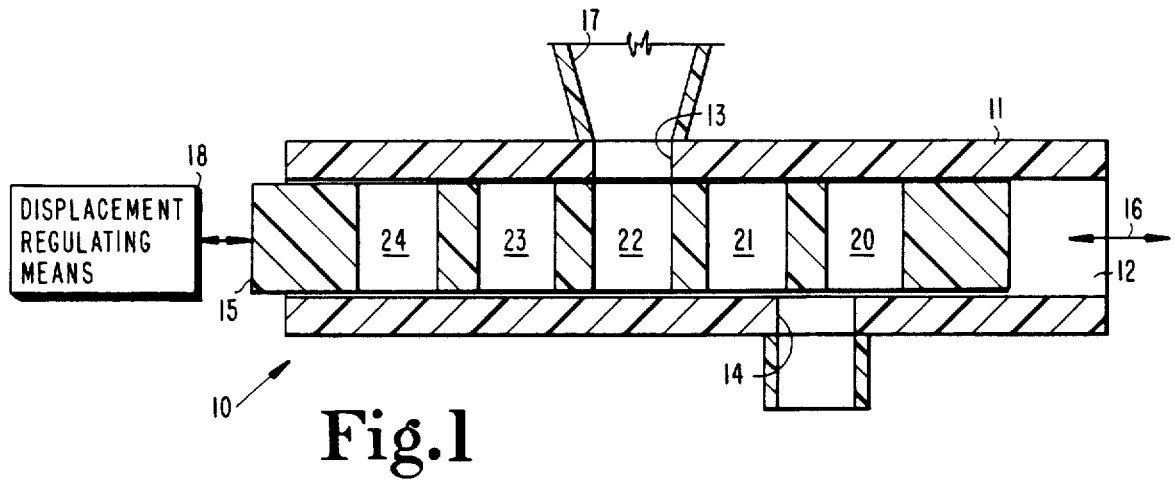
FIG. 1 is an elevational view of a dispensing apparatus in accordance with the present invention, shown in longitudinal section.

For the purposes of promoting an understanding of the present invention, reference will now be made to the embodiments illustrated in the drawings and specific language will be used to describe the same. It is nevertheless to be understood that no limitation of the scope of the invention is thereby intended, the proper scope of the invention being indicated by the claims appended below and the equivalents thereof.

Referring in particular to FIG. 1, there is illustrated one embodiment of a dispensing apparatus in accordance with the present invention, indicated generally by reference numeral 10. Dispensing apparatus 10 is particularly adapted for dispensing discrete measured amounts of a fluent material. A dispenser body 11 is provided which defines therein a horizontal tubular chamber 12. Tubular chamber 12 of FIG. 1 is rectangular in cross section, although it could also be of any other suitable polygonal cross section in this embodiment, or of circular cross section. Dispenser body 11 also defines an inlet port 13 communicating with the top of tubular chamber 12, and an outlet port 14 communicating with the bottom of tubular chamber 12. Inlet port 13 and outlet port 14 are offset with respect to each other along the length of tubular chamber 12.

A reservoir 17 for holding a fluent material is disposed in communication with inlet port 13 such that fluent material can flow by gravity from reservoir 17 through inlet port 13.

A piston 15 is disposed within tubular chamber 12 and is configured for reciprocal linear displacement therein, as shown by arrow 16. As illustrated, piston 15 is generally a solid of like cross section as tubular chamber 12, and is configured in tight fitting sliding engagement therewith. Piston 15 defines therethrough a plurality of vertical open-ended measuring holes 20, 21, 22, 23 and 24. Each of the measuring holes 20-24 are of circular cross section, but they could also be of polygonal cross section, if desired. Piston 15 need not be substantially solid, it being of prime importance only that the ends of each of the measuring holes 20-24 and the portion of piston 15 located between the ends of adjacent measuring holes be configured in tight fitting sliding engagement with the horizontal tubular chamber 12.

Because of the tight fitting relationship, each of the vertical measuring holes 20-24 in cooperation with tubular chamber 12 defines a measuring space therein. Each of the measuring spaces so defined is of a desired volume as determined by the size and configuration of the measuring hole and the tubular chamber.

Measuring holes 20-24 and inlet port 13 and outlet port 14 are spaced with respect to each other such that each measuring hole 20-24 alternately communicates with inlet port 13 and outlet port 14 as piston 15 is displaced linearly. It is important that the spacing be such that no measuring hole can communicate with inlet port 13 and outlet port 14 at the same time.

To dispense discrete measured amounts of fluent material from reservoir 17, piston 15 is first drawn to the left until at least one of of the measuring holes is aligned with and in communication with inlet port 13, whereupon fluent material flows from reservoir 17 into the measuring hole, filling it. Piston 15 is then moved to the right until at least one of the filled measuring holes is aligned with and in communication with outlet port 14, whereupon a discrete measured amount of fluent material is dispensed through outlet port 14. The above described procedure can be repeated to effect multiple dispensings. It will be readily appreciated that a plurality of dispensings of measured amounts of fluent material can be dispensed per each reciprocation of piston 15 by regulating the linear displacement of piston 15 by a suitable displacement regulating means 18 so that a selected number of adjacent measuring holes are filled and dispensed. Of course, it doesn't matter how many holes are filled as the piston is drawn to the left, so long as the number exceeds the number of holes desired to be dispensed thereafter as piston 15 is moved to the right.

It will also be readily appreciated that measuring holes 20-24 need not be of like volume. A particularly useful embodiment results if the cumulative running sum of the volumes of adjacent measuring holes corresponds to a preselected series of standard measured volumes. For example, the volume of the measuring space defined by hole 20 could be one teaspoon. The volume of hole 21 could be one tablespoon less one teaspoon. Hole 22 could then have a volume of ¼ cup less one tablespoon less one teaspoon. Thus, if one hole is dispensed (hole 20), the measured volume would be one teaspoon. If two holes are dispensed (holes 20 and 21), the measured volume would be one tablespoon. If three holes are dispensed (holes 20, 21 and 22), the measured volume would be ¼ cup. Such a series could be continued as desired, limited only by the number of holes and volumes thereof which could be accommodated within the desired length and diameter of the tubular chamber.

Figure 2:
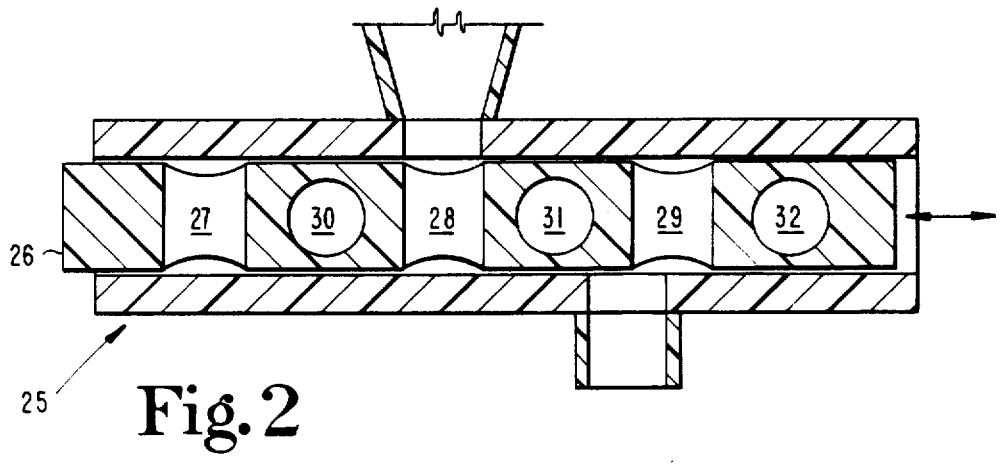
FIG. 2 is an elevational view of an alternative embodiment of a dispensing apparatus in accordance with the present invention, shown in longitudinal section.

Another embodiment is illustrated in FIG. 2, wherein a dispensing apparatus 25 includes two sets of measuring holes defined by one piston 26. A first set of holes 27, 28 and 29 are interspaced with and oriented at right angles to a second set of holes 30, 31 and 32. Each set of holes could represent a different series of standard measured volumes, or all holes in one set could be of like volume, as desired. Switching between each set of holes is accomplished by rotating piston 26 to bring the desired set of holes into vertical orientation. Piston 26 and the horizontal tubular chamber into which it is disposed must be configured to accommodate rotation of piston 26, which can be accomplished most easily by making each of circular cross section.

Figure 3:
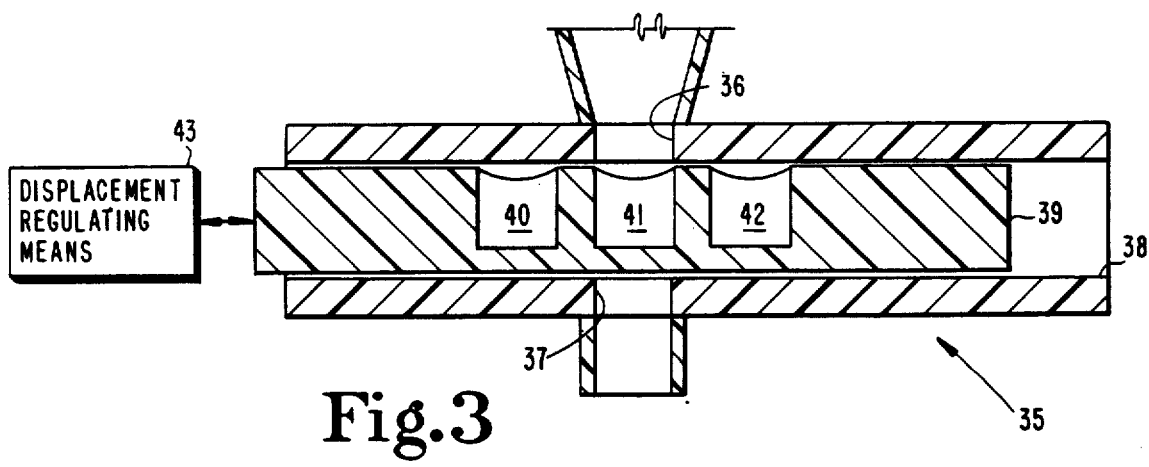
FIG. 3 is an elevational view of another alternative embodiment of a dispensing apparatus in accordance with the present invention, shown in longitudinal section.

A further embodiment of the present invention is illustrated in FIG. 3. Dispensing apparatus 35 is generally similar to apparatus 25 of FIG. 2, except that the inlet port 36 and the outlet port 37 are located radially opposite each other with respect to horizontal tubular chamber 38 which is of circular cross section. Piston 39, which is of circular cross section, is disposed within tubular chamber 38 and is configured for rotational and linear displacement therein. Piston 39 defines therein a plurality of measuring holes 40, 41 and 42, each hole having one end open and configured in tight fitting sliding engagement with tubular chamber 38, and the other end closed.

In this embodiment fluent material is dispensed by aligning the open end of one of holes 40-42 in communication with the inlet port 36 so that the fluent material can flow in through inlet port 36 and fill the hole in question. The piston is then rotated so as to bring the open end of the filled hole into alignment and communication with the outlet port 37 so that the fluent material in the hole can flow out through outlet port 37. Each of the holes 40-42 can be of different volumes, with each selectable by regulating the linear displacement of piston 39 by displacement regulating means 43 to bring the desired hole into registration with the inlet port 36.

While the preferred embodiments of the invention have been illustrated and described in some detail in the drawings and foregoing description, it is to be understood that this description is made only by way of example to set forth the best mode contemplated of carrying out the invention and not as a limitation to the scope of the invention which is pointed out in the claims below.

What is claimed is:

1. A dispensing apparatus for dispensing discrete measured amounts of fluent material, comprising:

a dispenser body defining a horizontal tubular chamber therein of circular cross section and further defining an inlet port communicating with the top of the tubular chamber and an outlet port communicating with the bottom of the tubular chamber, the inlet port and the outlet port being offset with respect to each other along the length of the tubular chamber;

a piston disposed within the tubular chamber and configured for reciprocal linear displacement therein, said piston further being rotatable within said tubular chamber, said piston defining therethrough a vertical measuring hole and a horizontal measuring hole oriented at substantially right angles to the vertical measuring hole, each measuring hole having open ends configured in tight-fitting sliding engagement with the tubular chamber, where there is defined a measuring space of a desired volume bounded by the tubular chamber and the measuring hole, each measuring hole alternately communicating with the inlet port and the outlet port when aligned therewith as said piston is displaced linearly; and a reservoir communicating with the inlet port; whereby alternate measuring holes are provided by rotating said piston to align the selected measuring hole with the inlet and outlet ports, and whereby the volume of fluent material dispensed from said reservoir per reciprocation of the piston is determined by the volume of the measuring space.

2. The dispensing apparatus of claim 1, in which said piston defines a plurality of horizontal measuring holes oriented at substantially right angles to the vertical measuring hole.

3. The dispensing apparatus of claim 2, in which the measuring holes are cylindrical.

4. The dispensing apparatus of claim 2, in which said piston defines a plurality of vertical measuring holes and the plurality of horizontal measuring holes are interspaced among the plurality of vertical measuring holes.

5. The dispensing apparatus of claim 4, in which the measuring holes are cylindrical.

* * * * *